United States Patent [19]  [11] 4,149,319
Nelle  [45] Apr. 17, 1979

[54] POSITIONING APPARATUS

[75] Inventor: Gunther Nelle, Siegsdorf, Fed. Rep. of Germany

[73] Assignee: Dr. Johannes Heidenhain GmbH, Traunreut, Fed. Rep. of Germany

[21] Appl. No.: 807,202

[22] Filed: Jun. 16, 1977

[30] Foreign Application Priority Data

Jun. 25, 1976 [DE] Fed. Rep. of Germany ....... 2628623

[51] Int. Cl.² ............................................. G01B 11/04
[52] U.S. Cl. ................................. 33/125 C; 308/3 R; 308/6 R; 356/375
[58] Field of Search ............. 308/6 R, 3 R; 33/125 R, 33/125 C, 125 A; 356/169, 170; 250/237 G

[56] References Cited

U.S. PATENT DOCUMENTS

| 2,886,717 | 5/1959 | Williamson et al. | 33/125 C |
| 3,531,650 | 9/1970 | Cronin | 250/237 G |
| 3,815,125 | 6/1974 | May | 250/237 |
| 3,816,002 | 6/1974 | Weig | 33/125 C |
| 3,816,003 | 6/1974 | Litke | 33/125 C |
| 4,054,330 | 10/1977 | Luo | 308/3 R |

FOREIGN PATENT DOCUMENTS 7507398  7/1975  Fed. Rep. of Germany ........ 33/125 C Primary Examiner—Richard E. Aegerter
Assistant Examiner—John W. Shepperd
Attorney, Agent, or Firm—Hume, Clement, Brinks, Willian, & Olds, Ltd.

[57] ABSTRACT

An apparatus for maintaining a positioning force on movable parts within a guide means, such as a scanning carriage mounted within a hollow body in an incremental measuring system. The positioning apparatus includes a leaf spring for mounting a pressure roller wherein the leaf spring is provided with at least one slot and the roller-mounting end of the leaf spring is forked. The pressure roller is thereby adjustable so that a rolling surface of the pressure roller remains in parallel alignment with a surface of the guide means.

4 Claims, 4 Drawing Figures

U.S. Patent
Apr. 17, 1979
4,149,319
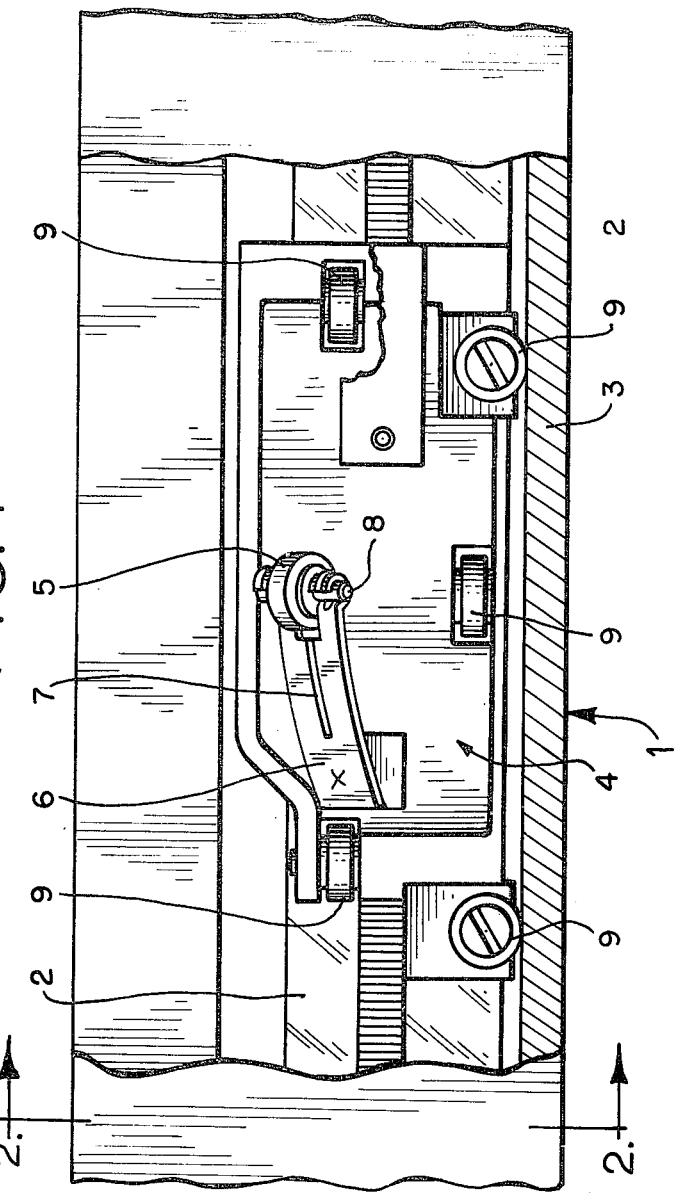
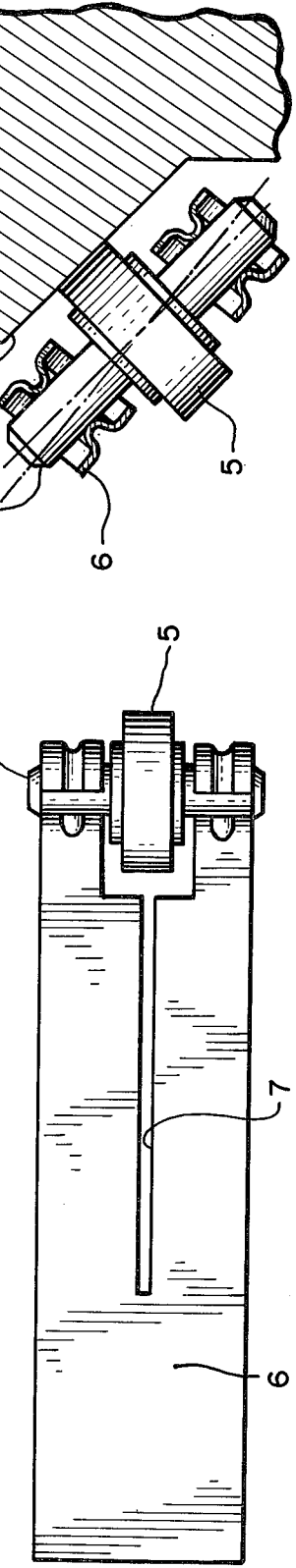

POSITIONING APPARATUS

BACKGROUND OF THE INVENTION

1. Field of the Invention

The invention relates to an apparatus for maintaining a positioning force on movable parts within a guide means. In the apparatus of the present invention there is provided a pressure roller with a cylindrical rolling surface and a leaf spring for generating a compression force which mounts the pressure roller at a part to be guided, such as a scanning carriage of a measuring system. The measuring system may be a known incremental path measuring system, wherein the scanning carriage must be guided very precisely to avoid measuring errors.

2. Description of the Prior Art

In the prior art positioning apparatus such as disclosed in German Gebrauchsmuster No. 7,507,398 are provided in measuring systems in which a measuring rod and a scanning carriage are mounted in a rigid hollow body for protection from environmental influences. The scanning carriage is seated directly at the scale by way of sliding shoes and at the hollow body via ball bearings. With the aid of a pressure roller which is a ball bearing seated at the hollow body on a planar surface, the scanning carriage is urged against the guiding surfaces of the measuring rod and the hollow body. A leaf spring is provided to generate the positioning force, to mount the pressure roller, and to fasten the pressure roller to the scanning carriage. The hollow body is sealed to provide protection against environmental influences by means of flexible sealing lips arranged in a roof-like manner upon a connecting means for attaching the scanning carriage to a mounting.

The prior art apparatus has the disadvantage of a mounting for the pressure roller which does not allow angular movement of the pressure roller, such as adjustments in the axis of rotation of the pressure roller, in order to compensate for unevenness in the guiding surfaces and minor deviations from the desired parallel relationship of the axis of rotation and the guiding surface. Without allowance for adjustment, forces may act on the scanning carriage which could possibly result in adulteration of a reading taken by the measuring system.

SUMMARY OF THE INVENTION

According to the present invention there is provided a positioning apparatus which overcomes the disadvantages of the prior art by allowing angular movement and adjustment of the positioning apparatus with respect to the guiding surfaces.

In a preferred embodiment of the present invention a positioning apparatus includes a leaf spring for mounting a pressure roller wherein the leaf spring is provided with at least one slot and the roller-mounting end of the leaf spring is forked. The pressure roller is preferably a ball bearing mounted to the forked spring via a shaft to permit angular movement with respect to the guiding surfaces.

Accordingly, the present invention provides an improved positioning apparatus which ensures parallel alignment of the pressure roller surfaces and a guiding surface in a relatively simple manner to assist in maintaining high precision in a measuring system. Other advantages, objects, and features of the present invention will become apparent upon reading the following detailed description of the preferred embodiment in conjunction with the accompanying drawings.

BRIEF DESCRIPTION OF THE DRAWINGS

FIG. 1 is a side view of the positioning apparatus of the present invention with a guide surface for the pressure roller removed;

FIG. 2 is a cross-sectional view of the positioning apparatus of FIG. 1 taken along line II—II, including and illustrating the guide surface for the pressure roller which is removed in FIG. 1;

FIG. 3 is an enlarged top view of the positioning apparatus of FIG. 1 illustrating the forked leaf spring and pressure roller assembly;

FIG. 4 is an enlarged sectional view of the positioning apparatus as shown in FIG. 2, illustrating the parallel alignment of the pressure roller surface and a guiding surface even when the leaf-spring forks are offset.

DESCRIPTION OF THE PREFERRED EMBODIMENT

Referring now to the drawings, and more particularly to FIGS. 1 and 2, there is illustrated a positioning apparatus according to the present invention which is especially suited for use in incremental path measuring system. The measuring system, indicated generally by reference numeral 1, includes a grid scale 2 which is fastened in a rigid hollow body 3 for protection against environmental influences. The hollow body 3 is preferably an extruded aluminum body with a U-shaped profile defining an aperture which is covered by means of flexible sealing lips (not shown) arranged in a roof-like manner. A scanning carriage 4, bearing the grid scanning plate (not shown), along with an illumination system (not shown) and photo elements (not shown), is appropriately seated by means of ball bearings 9 directly at the scale 2 and at a guiding surface 14 of the hollow body 3. The scanning carriage 4 is coupled to an object to be measured, such as a machine carriage, by means of a slender connecting means (not shown) which extends through the sealing lips. The aforedescribed elements of the measuring system 1 are well-known and explained in detail, for example, in the German Gebrauchsmuster No. 7,507,398, and in copending application Ser. No. 656,745, filed Feb. 9, 1976 for a LENGTH MEASURING INSTRUMENT, both of which are incorporated by reference herein.

Referring also now to FIGS. 3 and 4, it can be seen that the apparatus of the present invention provides a pressure roller 5 connected to the scanning carriage 4. The pressure roller 5 is preferably a ball bearing with cylindrical races and a cylindrical rolling surface. The pressure roller 5 is fastened to a leaf spring 6 via a shaft 8 inserted within the pressure roller 5. The end of the leaf spring opposite the pressure roller 5 is mounted on the scanning carriage 4 at an oblique angle so that the pressure roller is positioned obliquely to the graduation plane of the scale 2. The leaf spring 6 is provided with a slot 7 which allows an angular motion adjustment of the pressure roller 5. As a result of the forked configuration of the roller-mounting end of the leaf spring 6, which allows individual forks to be offset from each other, as shown in FIG. 4, the rolling surface of the pressure roller 5 is automatically adjusted to remain in parallel contact with a planar guiding surface 10 of the hollow body 3, which is inclined at substantially the same oblique angle as the ball bearing pressure roller 5. In particular, the rotation axis of the shaft 8 can be adjusted with respect to the guiding surface 10 to maintain a desired parallel relationship therebetween and to compensate for unevenness in the guiding surface 10. The present invention assures a precise guiding of the scanning carriage 4 so that a high reading precision of the incremental measuring system is obtained.

Though the embodiment hereinbefore described is preferred, many modifications and refinements which do not depart from the true spirit and scope of the invention may be conceived by those skilled in the art. It is intended that all such modifications be covered by the following claims.

I claim:

1. An apparatus for maintaining a positioning force on a scanning carriage of a measuring device comprising:
    a scanning carriage;
    guide means for guiding the movement of the scanning carriage along the measuring device;
    a leaf spring having a first section connected to the scanning carriage and a forked second section which defines first and second spring forks separated by a slot, wherein the slot has a length substantially greater than its width;
    a shaft having a first section mounted on the first spring fork and a second section mounted on the second spring fork; and
    a pressure roller mounted on the shaft between the first and second spring forks having a cylindrical rolling surface for contacting the guide means, said first and second spring forks providing substantially independent resilient support to the first and second shaft sections, respectively, to allow angular adjustment of the orientation of the pressure roller and the shaft with respect to the guide means.

2. The apparatus of claim 1 wherein the measuring device includes a hollow body which substantially encloses a scale, the scale defines a graduation plane, the scanning carriage is movably positioned to scan the scale, the guide means include a guiding surface defined in the hollow body inclined at an oblique angle to the graduation plane of the scale, and the shaft is mounted on the first and second spring forks to orient the shaft at substantially the same oblique angle as the guiding surface.

3. The apparatus of claim 2 wherein the pressure roller is a ball bearing.

4. The apparatus of claim 1 wherein the pressure roller is a ball bearing.

* * * * *